US009695943B2

(12) United States Patent
Kato

(10) Patent No.: US 9,695,943 B2
(45) Date of Patent: Jul. 4, 2017

(54) COMBINED SEAL RING WITH ENCODER AND ROLLING BEARING UNIT WITH ENCODER

(71) Applicant: NSK LTD., Shinagawa-ku, Tokyo (JP)

(72) Inventor: Meiji Kato, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/029,766

(22) PCT Filed: Sep. 19, 2014

(86) PCT No.: PCT/JP2014/074930
§ 371 (c)(1),
(2) Date: Apr. 15, 2016

(87) PCT Pub. No.: WO2015/056526
PCT Pub. Date: Apr. 23, 2015

(65) Prior Publication Data
US 2016/0245409 A1    Aug. 25, 2016

(30) Foreign Application Priority Data

Oct. 16, 2013    (JP) .................................. 2013-215358

(51) Int. Cl.
F16C 33/78    (2006.01)
F16C 19/08    (2006.01)
(Continued)

(52) U.S. Cl.
CPC ........... F16J 15/3492 (2013.01); F16C 19/08 (2013.01); F16C 33/783 (2013.01);
(Continued)

(58) Field of Classification Search
CPC ...... F16C 19/08; F16C 19/186; F16C 33/783; F16C 33/7823; F16C 33/7883;
(Continued)

(56) References Cited

U.S. PATENT DOCUMENTS 6,789,948 B2 * 9/2004 Nakajima ........... F16C 33/7879
324/174
6,857,782 B2 * 2/2005 Norimatsu .............. B60B 27/00
384/448
(Continued)

FOREIGN PATENT DOCUMENTS

EP    1041387 A1 * 10/2000 ............ F16C 19/186
EP    2525110 A1    11/2012
(Continued)

OTHER PUBLICATIONS

International Search Report dated Dec. 22, 2014 issued by the International Searching Authority in counterpart International Application No. PCT/JP2014/074930 (PCT/ISA/210/220).
(Continued)

Primary Examiner — Marcus Charles
(74) Attorney, Agent, or Firm — Sughrue Mion, PLLC

(57) ABSTRACT

A slinger has a substantially L-shaped cross-section and includes a rotating cylindrical portion and a rotating circular ring portion. An inner circumferential surface of the rotating cylindrical portion is a stepped cylindrical surface in which a large-diameter portion formed at a portion close to the rotating circular ring portion and a small-diameter portion formed in the remainder are continuously connected by a stepped portion. The encoder supported by the rotating circular ring portion is formed by solidifying and securing a molten permanent magnet material in a state that a molding die collides with the stepped portion. An outer diameter of a hub is defined as φD, an inner diameter of the small-diameter portion in a free state is defined as φd1, and an inner diameter of the encoder in a free state is defined as φd2, a relationship of φd1≤φd2<φD is satisfied.

5 Claims, 11 Drawing Sheets

(51) Int. Cl.
*F16J 15/34* (2006.01)
*F16C 41/00* (2006.01)
*F16C 19/18* (2006.01)

(52) U.S. Cl.
CPC ...... *F16C 33/7823* (2013.01); *F16C 33/7883* (2013.01); *F16C 41/007* (2013.01); *F16J 15/3456* (2013.01); *F16C 19/186* (2013.01); *F16C 2326/02* (2013.01)

(58) Field of Classification Search
CPC  F16C 41/007; F16C 2326/02; F16C 33/7876; F16J 15/3492; F16J 15/3456; B60B 27/0068; B60B 27/0073; G01P 3/487; G01P 3/443
USPC ........ 384/446–448, 544, 548, 477, 484–486, 384/488; 324/173, 207.25
See application file for complete search history.

(56) References Cited

U.S. PATENT DOCUMENTS

| | | | |
|---|---|---|---|
| 2004/0179760 A1* | 9/2004 | Nakajima | F16C 19/184 384/448 |
| 2008/0310782 A1* | 12/2008 | Walter | F16J 15/3264 384/486 |
| 2010/0189387 A1 | 7/2010 | Masui et al. | |
| 2010/0225309 A1* | 9/2010 | Takahashi | G01D 5/145 324/207.25 |
| 2010/0239201 A1* | 9/2010 | Nakajima | F16C 33/7879 384/446 |
| 2013/0022305 A1 | 1/2013 | Kurohara | |

FOREIGN PATENT DOCUMENTS

| | | | | |
|---|---|---|---|---|
| EP | 3026282 A1 | * | 6/2016 | ......... B60B 27/0073 |
| JP | 2002-48247 A | | 2/2002 | |
| JP | 2003-75193 A | | 3/2003 | |
| JP | 2005-233923 A | | 9/2005 | |
| JP | 2005321307 A | * | 11/2005 | |
| JP | 2007-52036 A | | 3/2007 | |
| JP | 2007085478 A | * | 4/2007 | |
| JP | 2007-270992 A | | 10/2007 | |
| JP | 2007270992 A | * | 10/2007 | |
| JP | 2007321881 A | * | 12/2007 | |
| JP | 2008-233110 A | | 10/2008 | |
| JP | 2009-185965 A | | 8/2009 | |
| JP | 2010-249168 A | | 11/2010 | |
| JP | 2012-93310 A | | 5/2012 | |
| JP | 2013-104455 A | | 5/2013 | |

OTHER PUBLICATIONS

Written Opinion dated Dec. 22, 2014 issued by the International Searching Authority in counterpart International Application No. PCT/JP2014/074930 (PCT/ISA/237).
Communication dated Sep. 1, 2016 issued by the European Patent Office in counterpart European Application No. 14853823.4.

* cited by examiner

COMBINED SEAL RING WITH ENCODER AND ROLLING BEARING UNIT WITH ENCODER

CROSS-REFERENCE TO RELATED APPLICATION

This application is U.S. National Stage of International Application PCT/JP2014/074930 having an International Filing Date of Sep. 19, 2014, which claims priority to Japanese Patent Application No. 2013-215358 filed on Oct. 16, 2013. The entire disclosures of the prior applications are considered part of the disclosure of the accompanying application, and are hereby incorporated by reference.

TECHNICAL FIELD

The present invention relates to improvement in a combined seal ring with an encoder that seals off open ends of a rolling bearing which is assembled into a rotation support of various mechanical devices and that detects a rotation speed of a rotary member supported by the rolling bearing and a rolling bearing unit with an encoder including the combined seal ring with an encoder. More particularly, the present invention relates to realization of a structure capable of securing sealability of a fitting part of a rotary cylindrical portion of a slinger and an outer circumferential surface of an inner race member. An example of the rotary support of various mechanical devices is a rolling bearing unit for support of vehicle wheels for supporting vehicle wheels of a vehicle (automobile) with a suspension device.

BACKGROUND ART

In order to rotatably support vehicle wheels of an automobile with a suspension device, a rolling bearing unit with an encoder 1 illustrated in FIGS. 9 and 10 is widely known in the related art (for example, see Patent Documents 1 and 2). In the rolling bearing unit with an encoder 1, an outer ring 2 which is an outer race member and a hub 3 which is an inner race member are arranged to be coaxial with each other. Plural balls 6 and 6 which are rolling elements are between double-row outer raceways 4 and 4 formed on the inner circumferential surface of the outer ring 2 and double-row inner raceways 5 and 5 formed on the outer circumferential surface of the hub 3 for each row. The balls 6 and 6 are held by retainers 7 and 7 so as to be rollable. With this configuration, the hub 3 is rotatably supported inside the outer ring 2 which is supported by and fixed to a suspension device.

Between the inner circumferential surface of the outer ring 2 and the outer circumferential surface of the hub 3, both axial end openings of an annular space 8 in which the balls 6 and 6 are located are seal off by a seal ring 9 and a combined seal ring with an encoder 10 over the entire circumference thereof. The seal ring 9 includes a metal insert 11 formed by a metal plate and plural seal lips 12 formed by an elastic member. The tip edges of the seal lips 12 are brought into sliding contact with the outer circumferential surface of an axially intermediate portion of the hub 3 over the entire circumference in a state in which the metal insert 11 is internally fitted and fixed to the axially outboard end portion of the outer ring 2 by tight fit (The outboard in the axial direction indicates the left side in the drawings on the outboard in the width direction of a vehicle body in an assembled state into an automobile. On the contrary, the inboard in the width direction which is the right side in the drawings is indicated by the inboard in the axial direction. This definition is true of the entire specification).

The combined seal ring with an encoder 10 includes a seal ring 14 and a slinger 15 composing a combined seal ring 13 and an encoder 16. The seal ring 14 includes a metal insert 17 with an L-shaped cross-section which has an annular shape as a whole and an elastic member 18. The metal insert 17 is obtained by forming a metal plate such as a mild steel plate in an L cross-sectional shape and in an annular shape as a whole. The metal insert 17 includes a fixed cylindrical portion 19 which is internally fitted to the inner circumferential surface of an axial inner end portion of the outer ring 2 by tight fit and a fixed circular ring portion 20 which is bent inward in the radial direction from an axially outboard end edge of the fixed cylindrical portion 19 toward the outer circumferential surface of the hub 3. The elastic member 18 is bonded to the entire circumference of the metal insert 17 and includes one or more (three in the illustrated example) seal lips 21a to 21c. In general, the elastic member 18 is formed by rubber and is fixed to the metal insert 17 by baking.

On the other hand, the slinger 15 includes a rotating cylindrical portion 22 which is externally fitted and fixed to the outer circumferential surface of an axially inboard end portion of the hub 3 (an inner ring constituting the hub 3 along with a hub body) by tight fit and a rotating circular ring portion 23 which is bent outward in the radial direction from an axially inboard end edge of the rotating cylindrical portion 22 to the inner circumferential surface of the outer ring 2. In the slinger 15, portions which are brought into sliding contact with the tip edges of the seal lips 21a to 21c on the outer circumferential surface of the rotating cylindrical portion 22 and the axially outboard side surface of the rotating circular ring portion 23 have smooth surfaces.

The encoder 16 is formed by a permanent magnet such as a rubber magnet or a plastic magnet and is magnetized in the axial direction. The magnetization direction is made to vary alternately at equal intervals in the circumferential direction. Accordingly, on an axially inboard surface of the encoder 16 which is a detection target surface, an S pole and an N pole are arranged alternately at equal intervals in the circumferential direction. The detection target surface of the encoder 16 is set to face a detection unit of a sensor so as to measure a rotation speed of a vehicle wheel rotating along with the hub 3. A signal indicating the measured rotation speed of the vehicle wheel is used to control a driving stabilizing system of a vehicle such as an anti-lock brake system (ABS) or a traction control system (TCS).

In a first example having the above-mentioned structure in the related art, the combined seal ring with an encoder 10 can effectively prevent entrance of relatively large substance such as dust, but has difficulty in reliably preventing intrusion of rainwater, muddy slurry, or the like. That is, in the combined seal ring with an encoder 10, the rotating cylindrical portion 22 of the slinger 15 is externally fitted and fixed to the outer circumferential surface of the axially inboard end portion of the hub 3, and a structure for sealing the fitting part is not formed. Even in a state in which the rotating cylindrical portion 22 of the slinger 15 is externally fitted to the outer circumferential surface of the axially inboard end portion of the hub 3 by tight fit, it is not possible to avoid generation of a minute clearance in the fitting part. When moisture intrudes into the minute clearance, at least one circumferential surface of both circumferential surfaces is corroded and thus the volume of that part is increased and the minute clearance is enlarged. There is a possibility that moisture will intrude into an annular space 8 through the enlarged clearance. The intrusion of moisture into the annular space 8 causes degradation in durability of the bearing unit due to degradation of a lubricant, which is not desirable. Similarly, it is difficult to satisfactorily secure sealability of the fitting part using only the combined seal ring with an encoder 10 having the above-mentioned structure in the related art.

For the purpose of prevention of the above-mentioned intrusion of rainwater or the like into the annular space, for example, Patent Document 3 proposes use of an combined seal ring with an encoder 10a illustrated in FIG. 11. In the second example having this structure, a lip portion 24 having an inner diameter smaller than the inner diameter of a rotating cylindrical portion 22a of a slinger 15a is formed in the inner circumferential edge portion of an encoder 16a. In a state in which the rotating cylindrical portion 22a of the slinger 15a is externally fitted and fixed to a hub 3a, the lip portion 24 is brought into elastic contact with the outer circumferential surface of the hub 3a.

However, in the second example having the above-mentioned structure, it is difficult to satisfactorily secure sealability of the fitting part of the rotating cylindrical portion 22a of the slinger 15a and the outer circumferential surface of the hub 3a for the following reasons. That is, since the material of the lip portion 24 is the same as the material of the encoder 16a and includes a lot of ferromagnetic material such as ferrite (for example, 80 wt % to 90 wt %) to secure sufficient magnetism, the lip portion is less likely to be elastically deformed and more fragile than a general sealing material. On the other hand, the encoder 16a is formed by disposing the slinger 15a in a molding die (mold) and fixing (fixing by vulcanization or injection molding) a permanent magnet material (a polymer material such as rubber or synthetic resin containing a ferromagnetic material) which will be a permanent magnet to the slinger 15a. When the encoder 16a is formed in this way, a portion which will be the lip portion 24 has to be deformed greatly (has to be forced extraction) depending on the magnitude of an interference in pulling out the slinger 15a and the solidified permanent material (non-magnetized encoder) from the molding die. Since it is difficult to greatly deform the portion which will be the lip portion 24 in this way, it is difficult to secure the interference of the lip portion 24 to be great. When the rotating cylindrical portion 22a of the slinger 15a is externally fitted and fixed to the hub 3a by tight fit, the rotating cylindrical portion 22a is elastically enlarged in diameter, but the rotating cylindrical portion 22a and the rotating circular ring portion 23a are formed continuous and thus the influence of the enlargement in diameter of the rotating cylindrical portion 22a is likely to be transmitted to the rotating circular ring portion 23a. Accordingly, the encoder 16a supported and fixed to the rotating circular ring portion 23a is likely to be enlarged in diameter and a decrease in interference of the lip portion 24 increases. In case of the sealing structure using the lip portion 24, the magnitude of its bending deformation affects the magnitude of a tightening force. Accordingly, without securing the great interference to increase the bending deformation, it is not possible to secure a satisfactory tightening force. However, since the material of the lip portion 24 is not likely to be elastically deformed, it is difficult to secure a satisfactory tightening force in spite of securing of the interference. As a result, even in the second example having the above-mentioned structure, it is difficult to satisfactorily secure sealability of the fitting part of the rotating cylindrical portion 22a of the slinger 15a and the outer circumferential surface of the hub 3a.

RELATED ART REFERENCE

Patent Document

Patent Document 1: JP-A-2008-233110
Patent Document 2: JP-A-2009-185965
Patent Document 3: JP-A-2007-52036

SUMMARY OF THE INVENTION

Problems to be Solved by the Invention

The present invention is made in consideration of the above-mentioned circumference and an object thereof is to realize structures of a combined seal ring with an encoder and a rolling bearing unit with an encoder which can improve sealability of a fitting part of a rotating cylindrical portion of a slinger and an outer circumferential surface of an inner race member.

Means for Solving the Problems

A combined seal ring with an encoder according to the present invention is used to seal off an end opening of an annular space which is present between an outer circumferential surface of a rotating inner race member under use and an inner circumferential surface of a stationary outer race member under use and to detect a rotation speed of the inner race member, and includes: a seal ring that is internally fitted and fixed to the outer race member; a slinger that is externally fitted and fixed to the inner race member; and an encoder that is supported and fixed to the slinger.

The seal ring includes a metal insert and an elastic member having at least one seal lip bonded to the entire circumference of the metal insert.

The slinger has a substantially L-shaped cross-section and an annular shape as a whole by bending a metal plate and includes a rotary cylindrical portion that is externally fitted and fixed to the inner race member by tight fit and a rotating circular ring portion that is bent outward in a radial direction from an axially one-end edge of the rotary cylindrical portion.

The encoder is formed of a permanent magnet in which an S pole and an N pole are alternately arranged in a circumferential direction, is formed in a circular ring shape as a whole, and is supported and fixed to a side surface opposite to a side surface of the rotating circular ring portion facing the seal lip.

Particularly, in the combined seal ring with an encoder according to the present invention, an inner circumferential surface of the rotating cylindrical portion is a stepped cylindrical surface in which a large-diameter portion formed at an axially one-end side of the rotating cylindrical portion and a small-diameter portion formed in the remainder are continuously connected by a stepped portion.

The encoder does not have a lip on an inner circumferential surface thereof and is formed by solidifying and securing a molten permanent magnet material (a polymer material such as rubber or synthetic resin (for example, plastic) into which a ferromagnetic material such as ferrite is mixed) to the slinger in a state in which the slinger is disposed in a molding die such that a part of the molding die collides with the stepped portion.

When an outer diameter of a portion to which the slinger is externally fitted and fixed on the outer circumferential surface of the inner race member is defined as $\phi D$, an inner diameter of the small-diameter portion in a free state is defined as φd1, and an inner diameter of the encoder in a free state is defined as φd2, a relationship of φd1≤φd2<φD is satisfied.

When the combined seal ring with an encoder according to the present invention is put into practice, for example, like the invention according to claim 2, a radial thickness of the rotary cylindrical portion may be smaller in a portion matching the large-diameter portion than in a portion matching the small-diameter portion in the axial direction.

For example, like the invention according to claim 3, at least a part in the axial direction of a portion having a smallest inner diameter in the inner circumferential surface of the encoder may be located farther from the rotating cylindrical portion in the axial direction than a side surface to which the encoder is supported and fixed in the rotating circular ring portion.

For example, like the invention according to claim 4, a portion having a smallest inner diameter in the inner circumferential surface of the encoder may be constituted by a cylindrical surface portion of which the inner diameter does not vary in the axial direction.

A rolling bearing unit with an encoder according to the present invention includes: an inner race member (for example, a hub) that has an inner raceway on an outer circumferential surface thereof; an outer race member (for example, an outer ring) that has an outer raceway on an inner circumferential surface; plural rolling elements (for example, balls, cylindrical rollers, or taper rollers) that are disposed to be rollable between the inner raceway and the outer raceway; and a combined seal ring that seals off an end opening of an annular space present between the outer circumferential surface of the inner race member and the inner circumferential surface of the outer race member.

Particularly, in the rolling bearing unit with an encoder according to the present invention, the combined seal ring may be the combined seal ring with an encoder according to any one of claims 1 to 4.

Advantage of the Invention

According to the combined seal ring with an encoder and the rolling bearing unit with an encoder of the present invention having the above-mentioned configurations, it is possible to improve sealability of a fitting part of a rotating cylindrical portion of a slinger and an outer circumferential surface of an inner race member.

That is, in the present invention, the inner circumferential surface of the rotating cylindrical portion constituting the slinger is set to a stepped cylindrical surface in which the large-diameter portion formed on an axially one-end side of the rotating cylindrical portion and the small-diameter portion formed in the remainder are continuously connected by the stepped portion. Accordingly, by externally fitting and fixing the small-diameter portion of the rotating cylindrical portion to the inner race member by tight fit, the intrusion of the enlargement in diameter of the small-diameter portion can be effectively prevented from being transmitted to the rotating circular ring portion by elastically deforming the portion matching the large-diameter portion formed between the small-diameter portion and the rotating circular ring portion even when the portion matching the small-diameter portion is elastically enlarged in diameter. The rotating circular ring portion has large rigidity in the radius direction due to its shape. Accordingly, since the enlargement in diameter of the encoder is effectively prevented, the inner diameter of the encoder can be kept smaller than the outer diameter of the portion of the outer circumferential surface of the inner race member to which the slinger is externally fitted and fixed. As a result, according to the present invention, it is possible to bring the inner circumferential surface of the encoder into contact with the outer circumferential surface of the inner race member to have an interference over the entire circumference.

Since a material obtained by solidifying the permanent magnet material is used as the encoder, this configuration is advantageous for increasing the interference. That is, the inner diameter of the pre-magnetized encoder pulled out from the molding die is smaller than the outer diameter of a portion, which forms the inner circumferential surface of the encoder, of the inner surface of the molding die by the solidification. Accordingly, even when the inner circumferential edge of the non-magnetized encoder is not deformed or the degree of deformation is suppressed to be small in pulling the slinger and the non-magnetized encoder out of the molding die, it is possible to increase the interference.

In the present invention, a lip is not formed on the inner circumferential surface of the encoder. Accordingly, when the slinger is externally fitted and fixed to the inner race member, a portion having the smallest inner diameter or the vicinity thereof on the inner circumferential surface of encoder is compressed in the radial direction by contact with the outer circumferential surface of the inner race member. In this way, a compression force generated in the inner circumferential edge of the encoder generates a tightening force larger than the tightening force generated based on bending deformation of a lip. Accordingly, even when the magnitude of the interference is smaller in comparison with the case in which a lip is formed, it is possible to generate a satisfactorily large tightening force using the inner circumferential surface of the encoder.

As a result, according to the present invention, it is possible to improve sealability of a fitting part of the rotary cylindrical portion constituting the slinger and the outer circumferential surface of the inner race member.

MODES FOR CARRYING OUT THE INVENTION

First Example of Embodiment

Figure 1:
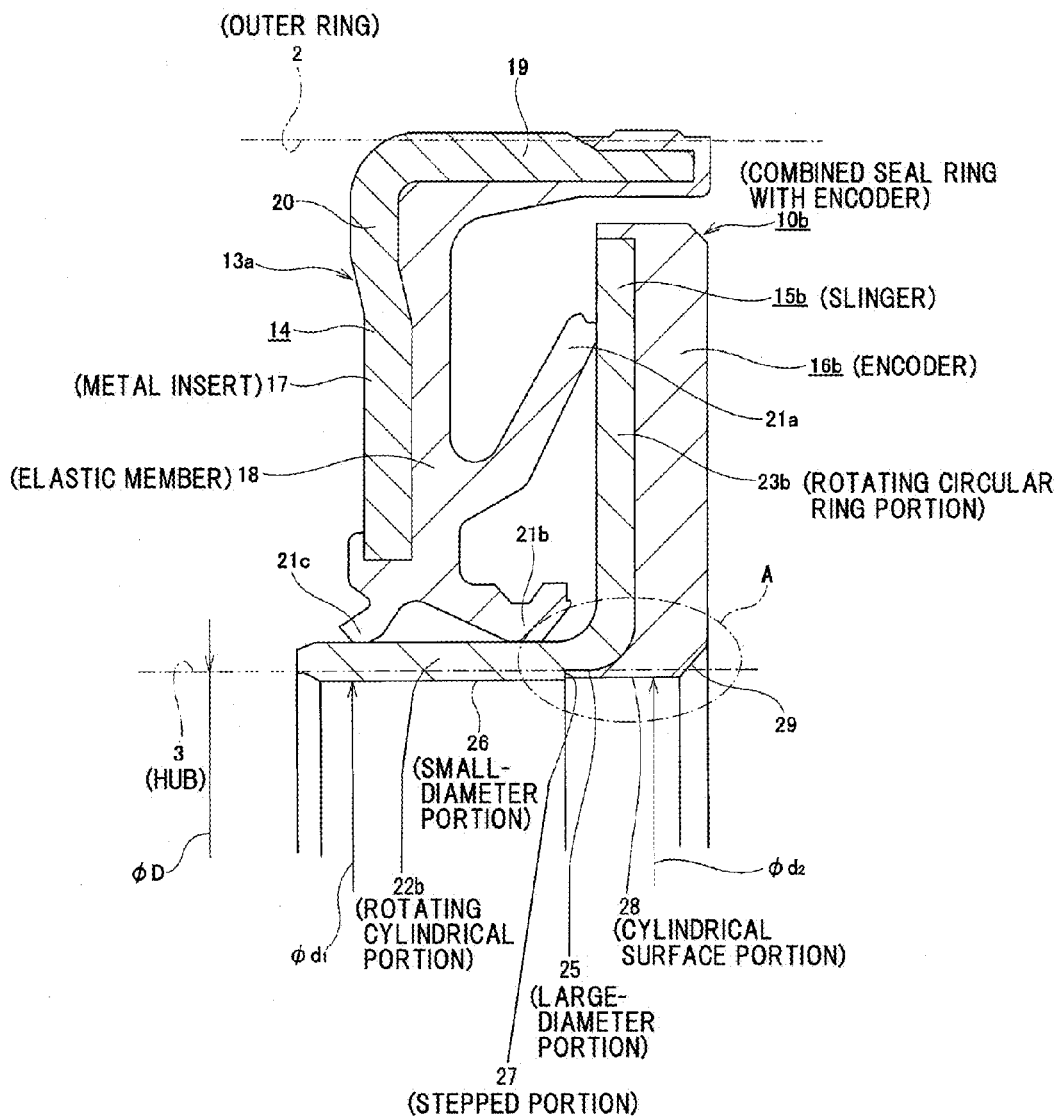
FIG. 1 is a partial cross-sectional view illustrating a first example of an embodiment of the present invention in which a combined seal ring with an encoder is extracted.
Figure 2:
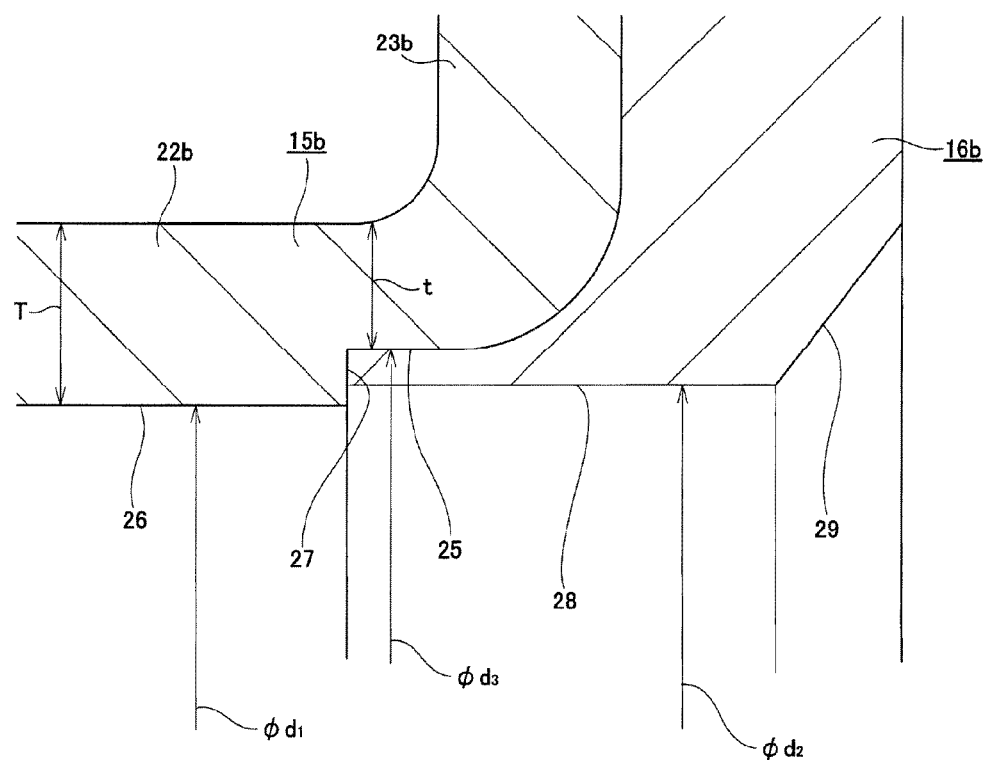
FIG. 2 is an enlarge view of a part corresponding to part A in FIG. 1.

A first example of an embodiment of the present invention will be described below with reference to FIGS. 1 to 4. This example is characterized by a partial structure that can improve sealability of a fitting part of a rotating cylindrical portion 22b of a slinger 15b and an outer circumferential surface of a hub 3 using an inner circumferential portion of an encoder 16b. Since the other configurations and operational advantages including the entire structure of a rolling bearing unit with an encoder are basically the same as those of the first example having the above-mentioned structure in the related art, like elements are referenced by like reference numerals and illustration and description thereof will not be repeated or will be described in brief. Features of this example will be mainly described below.

A combined seal ring with an encoder 10b according to this example includes a seal ring 14 and a slinger 15b, which constitute a combine seal ring 13a, and an encoder 16b. The seal ring 14 includes a metal insert 17 and an elastic member 18. The metal insert 17 has an L-shaped cross-section by bending a metal plate such as a mild steel plate by stamping and is formed in an annular shape as a whole. The metal insert 17 includes a fixed cylindrical portion 19 that is internally fitted and fixed to the inner circumferential surface of an axially inboard end portion of an outer ring 2 which is an outer race member by tight fit and a fixed circular ring portion 20 that is bent inward in the radial direction from an axially outboard end edge of the fixed cylindrical portion 19. The elastic member 18 is formed of an elastomer such as rubber, is bonded to the entire circumference of the metal insert 17, and includes three seal lips 21a to 21c.

The slinger 15b has an L-shaped cross-section by bending a metal plate such as a ferrite-based stainless steel plate such as SUS430 by stamping and is formed in an annular shape as a whole. The slinger 15b includes a rotating cylindrical portion 22b that is externally fitted and fixed to the outer circumferential surface of an axially inboard end portion of a hub 3 (an inner ring constituting the hub 3 along with a hub body) which is an inner race member by tight fit and a rotating circular ring portion 23b that is bent outward in the radial direction from an axially inboard-end edge (which corresponds to the axially one-end edge in the appended claims) of the rotating cylindrical portion 22b. In the slinger 15b, portions, which are brought into sliding contact with the tip edges of the seal lips 21a to 21c, in the outer circumferential surface of the rotating cylindrical portion 22b and the axially outboard surface of the rotating circular ring portion 23b are set to smooth surfaces. Among the seal lips 21a to 21c, the tip edge of the outside seal lip 21a which is called a side lip, which is disposed on the outermost side in the radial direction, and which is formed to protrude inward in the axial direction is brought into sliding contact with the axially outboard surface of the rotating circular ring portion 23b over the entire circumference. On the other hand, the tip edges of the remaining two seal lips of the intermediate and inside seal lips 21b and 21c are brought into sliding contact with the outer circumferential surface of the rotating cylindrical portion 22b over the entire circumference.

Particularly, in this example, the inner circumferential surface of the rotating cylindrical portion 22b is set to a stepped cylindrical surface. Accordingly, in the inner circumferential surface of the rotating cylindrical portion 22b, a large-diameter portion 25 is formed in an axially inboard end portion of the rotating cylindrical portion 22b and a small-diameter portion 26 is formed in the remainder (an axially outboard end portion and a portion close to the inboard end). The large-diameter portion 25 and the small-diameter portion 26 are continuously connected with a stepped portion 27 having a circular ring shape. A radial thickness (thickness) of the rotating cylindrical portion 22b is smaller in a part (t) matching the large-diameter portion 25 than in a part (T) matching the small-diameter portion 26 in the axial direction (T>t). In a free state before the rotating cylindrical portion 22b is externally fitted and fixed to the hub 3, a half value (($\phi$d3−$\phi$d1)/2) of a difference between the inner diameter ($\phi$d3) of the large-diameter portion 25 and the inner diameter ($\phi$d1) of the small-diameter portion 26 is set to substantially 1/10 to 1/4 of the thickness (T) of the metal plate (a portion other than the large-diameter portion 25) constituting the slinger 15b. In this example, since the slinger 15b is internally fitted and fixed to the hub 3 by tight fit, the inner diameter ($\phi$d1) of the small-diameter portion 26 in the rotating cylindrical portion 22b is set to be smaller than the outer diameter ($\phi$D) of the axially inboard end portion of the hub 3 ($\phi$d1<$\phi$D). The stepped portion 27 (and the large-diameter portion 25) may be formed in advance at the time of forming the slinger 15b by stamping, or may be machined at the time of manufacturing the encoder 16b using a molding die (32a) to be described later.

The encoder 16b is supported and fixed to the axially inboard surface (the side surface opposite to the side surface facing the seal lips 21a to 21c) of the rotating circular ring portion 23b of the slinger 15b so as to be coaxial with the slinger 15b. The encoder 16b is formed of a permanent magnet such as a rubber magnet or a plastic magnet, is formed in a circular ring shape as a whole, and is magnetized in the axial direction. The magnetization direction is made to vary alternately at equal intervals in the circumferential direction. Accordingly, in the axial inside surface of the encoder 16b which is a detection target surface, an S pole and an N pole are alternately arranged at equal intervals in the circumferential direction.

Figure 11:
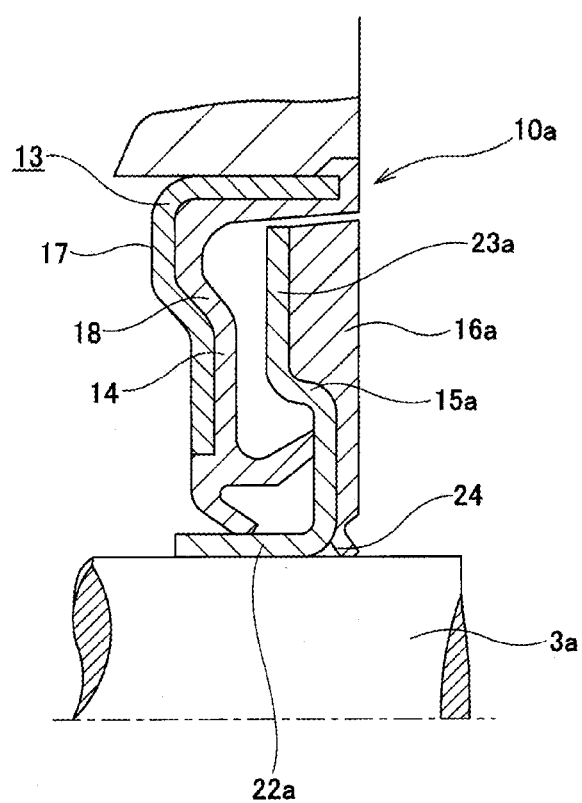
FIG. 11 is a partial cross-sectional view illustrating a second example of the structure according to the related art and corresponds to FIG. 10.

Particularly, in this example, the inner circumferential surface of the encoder 16b includes a cylindrical surface portion 28 having a single cylindrical surface shape which is formed in the axially outboard end portion and the portion close to the inboard end over the entire circumference and a chamfered portion 29 having a partial conical surface shape which is formed in the axially inboard end portion, and does not have a lip portion 24 (see FIG. 11) similar to in the second example having the above-mentioned structure in the related art. In the inner circumferential surface of the encoder 16b, an axially inboard half portion of the cylindrical surface portion 28 having the smallest inner diameter is located inside the axially inboard surface of the rotating circular ring portion 23b in the axial direction. In the free state before the slinger 15b is externally fitted and fixed to the hub 3, the inner diameter ($\phi$d2) of the cylindrical surface portion 28 is set to be smaller than the outer diameter ($\phi$D) of the axially inboard end portion of the hub 3 and larger than the inner diameter ($\phi$d1) of the small-diameter portion 26 ($\phi$d1<$\phi$d2<$\phi$D). In general, the magnitude of the interference when the slinger 15b is externally fitted and fixed to the hub 3 by tight fit is often set to approximately 0.15% to 0.3% of the outer diameter ($\phi$D) of the hub 3 (0.997×$\phi$D<$\phi$d1<0.9985×$\phi$D). Accordingly, the extent (diameter difference $\phi$d2−$\phi$d1) by which the inner diameter ($\phi$d2) of the encoder 16b is set to be larger than the inner diameter ($\phi$d1) of the small-diameter portion 26 can be set to approximately 0.05% to 0.25% of the inner diameter ($\phi$d2) of the encoder 16b (0.995×$\phi$d2<$\phi$d1<0.9975×$\phi$d2).

Figure 3:
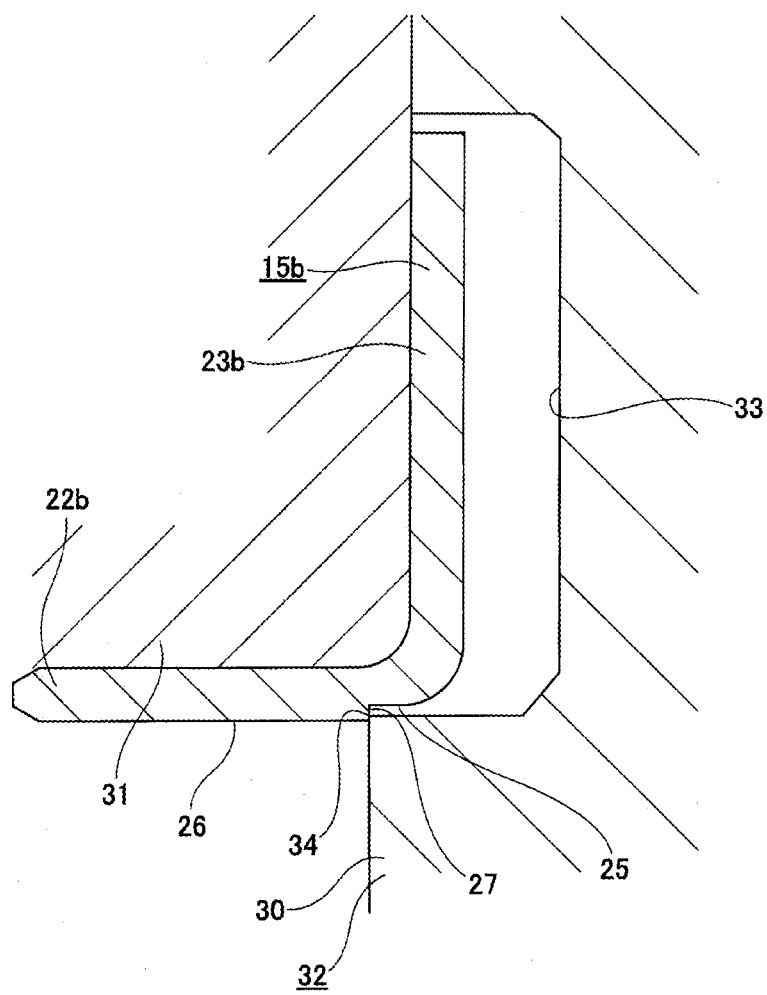
FIG. 3 is a partial cross-sectional view illustrating a state in which a slinger is set in a molding die to manufacture an encoder.
Figure 4:
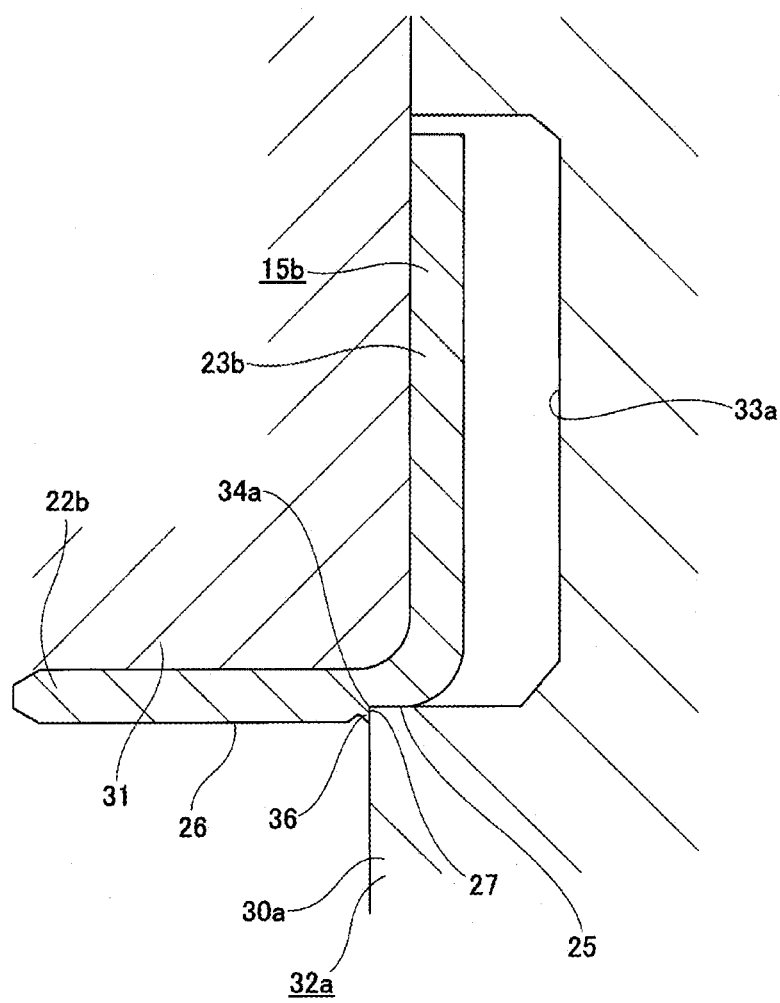
FIG. 4 is a partial cross-sectional view illustrating another example.

The encoder 16b having the above-mentioned configuration is manufactured using a molding die (mold) 32 (32a) including a pair of upper die 30 (30a) and lower die 31 which are formed of metal. Particularly, when the stepped portion 27 (and the large-diameter portion 25) is formed in advance on the inner circumferential surface of the rotating cylindrical portion 22b, as illustrated in FIG. 3, the slinger 15b is disposed in an annular cavity 33 of the molding die 32 in a state in which an angular portion 34 formed in the central outer circumferential portion of the upper die 30 collides with the stepped portion 27. On the other hand, when the stepped portion 27 (and the large-diameter portion 25) is not formed in advance on the inner circumferential surface of the rotating cylindrical portion 22b, the stepped portion 27 and the large-diameter portion 25 are formed on the inner circumferential surface of the rotating cylindrical portion 22b (the small-diameter portion is formed in the remainder) by driving an angular portion 34a formed in the central outer circumferential edge portion of an upper die 30a formed of an carbide material into the inner circumferential surface of the rotating cylindrical portion 22b and plastically deforming the driven portion at the time of setting the slinger 15b in a cavity 33a of a molding die 32a as illustrated in FIG. 4, and the angular portion 34a collides with the stepped portion 27. In this way, the reason of causing the angular portion 34 (34a) of the upper die 30 (30a) to collide with the stepped portion 27 is that occurrence of flash in which a permanent magnet material leaks to a portion which does not need to be covered with the encoder 16b on the inner circumferential surface of the rotating cylindrical portion 22b is prevented when a molten permanent magnet material is sent out into the cavity 33 (33a) in a pressurized state as will be described later. As illustrated in FIG. 4, when the inner circumferential surface of the rotating cylindrical portion 22b of the slinger 15b is plastically deformed by the angular portion 34a of the upper die 30a, an extra-thickness portion (burrs) 36 protruding inward in the radial direction is formed on the front side (on the axially outboard) of the portion which is the stepped portion 27 on the inner circumferential surface of the rotating cylindrical portion 22b. Accordingly, in this example, the quantity of plastic deformation (the radial size and the axial length of the portion to be plastically deformed) is regulated such that the inner diameter of the extra-thickness portion 36 is not smaller than the inner diameter of the small-diameter portion 26.

In both cases of FIGS. 3 and 4, when the slinger 15b is disposed in the cavity 33 (33a), a molten permanent magnet material (in which, for example, 80 wt % to 90 wt % of a ferromagnetic material such as ferrite is mixed into a polymer material such as rubber or synthetic resin (plastic)) is sent out to the cavity 33 (33a) in a pressurized state. At this time, the magnetic intensity after magnetization is increased by applying a magnetic field in the axial direction to orient a magnetic material in the permanent magnet material. By solidifying the permanent magnet material, the permanent magnet material is secured to the axial inside surface of the rotating circular ring portion 23b of the slinger 15b (bonded by vulcanization or injection molding).

Then, the slinger 15b and the non-magnetized encoder (solidified permanent magnet material) are pulled out from the molding die 32 (32a), and an annealing process of carrying out secondary heating using a furnace such as an oven is performed on the non-magnetized encoder (for example, the temperature is raised from the room temperature to 150° C. to 200° C. for three to four hours, the raised temperature is kept for two to four hours, and then the temperature is lowered to the room temperature for three to five hours). Accordingly, when rubber is used as the permanent magnet material, vulcanization is carried out to increase crosslinking and to improve the strength. On the other hand, when synthetic resin is used as the permanent magnet material, crystallization is carried out, and a residual stress decrease, thereby obtaining dimensional stability and improving the strength. For example, when nitrile rubber is used as the permanent magnet material, most crosslinking is completed at the time of vulcanization and thus necessity for the annealing process is lower than that in the other types of rubber, but the annealing process can be carried out to increase crosslinking and to improve the strength. When acryl rubber or fluorine rubber is used, the annealing process is necessarily performed.

After the annealing process is performed, the non-magnetized encoder is disposed to face a magnetization yoke which is not illustrated and the non-magnetized encoder is magnetized in the axial direction. This magnetization operation may employ an index magnetization yoke that sequentially magnetizes the non-magnetized encoder while rotating as well as an annular magnetization yoke that simultaneously magnetizes the detection target surface of the non-magnetized encoder over the entire circumference (that performs simultaneous magnetization) as the magnetization yoke. By this magnetization operation, the encoder 16b formed of a permanent magnet can be obtained in a circular ring shape in which an S pole and an N pole are alternately arranged at equal intervals in the circumferential direction on the axial inside surface as the detection target surface.

Figure 9:
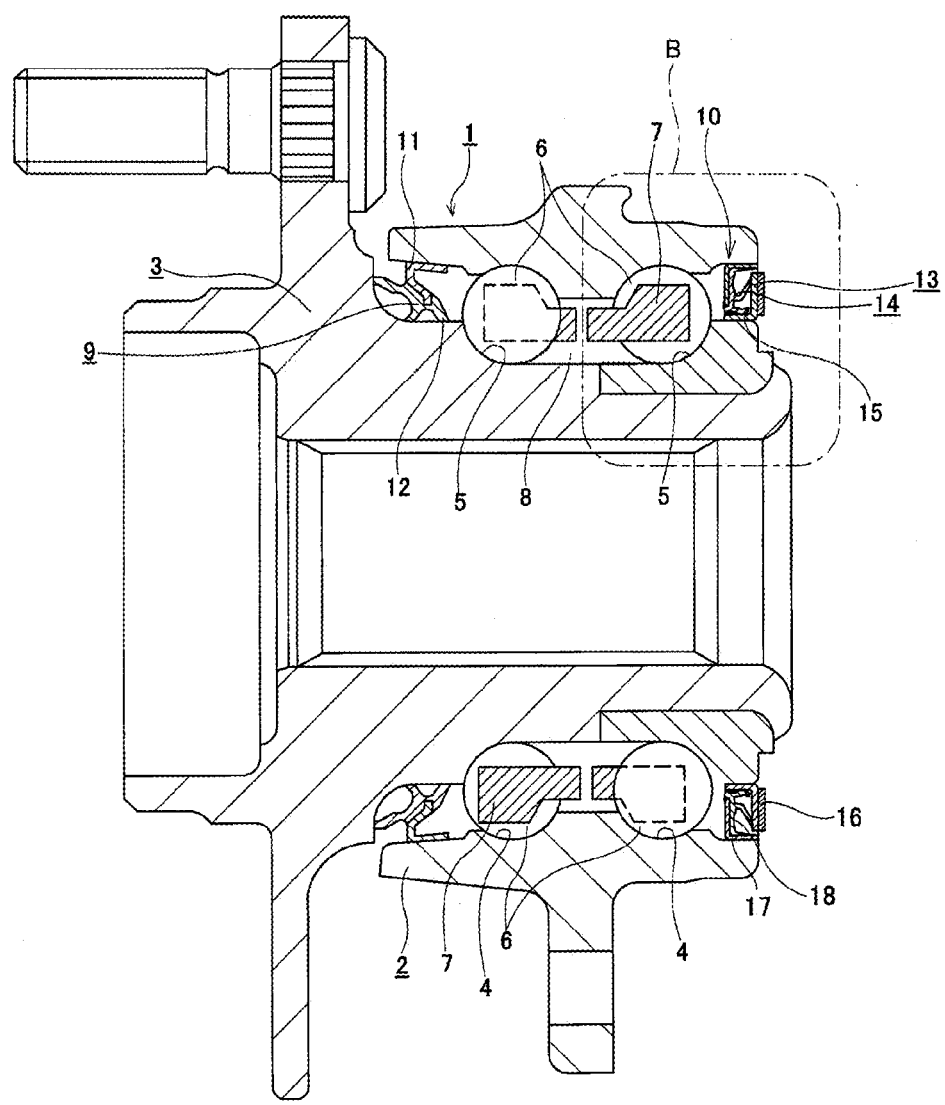
FIG. 9 is a cross-sectional view illustrating a first example of a rolling bearing unit with an encoder known in the related art.
Figure 10:
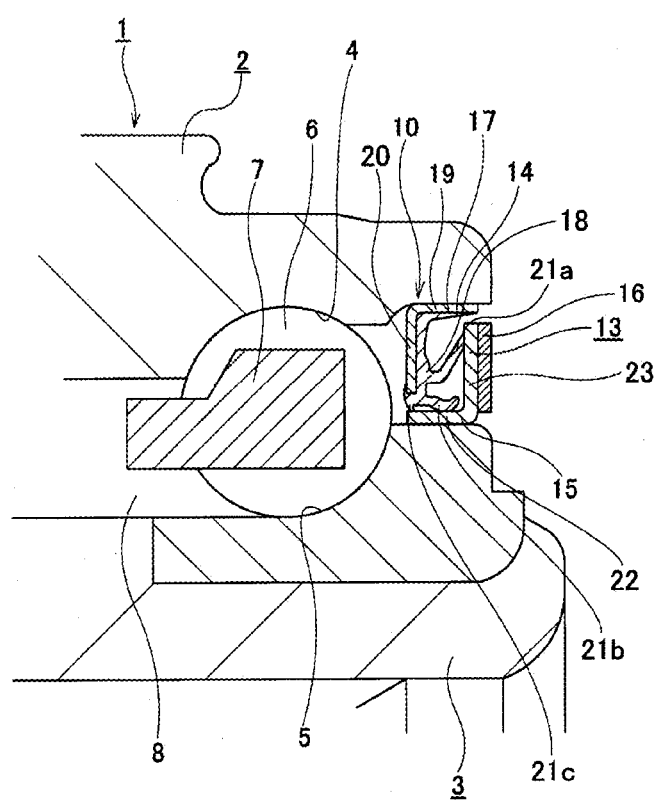
FIG. 10 is an enlarged view of part B in FIG. 9.

In the combined seal ring with an encoder 10a according to this example having the above-mentioned configuration, the fixed cylindrical portion 19 of the metal insert 17 is internally fitted and fixed to the outer ring 2 which does not rotate under use, and the small-diameter portion 26 of the rotary cylindrical portion 22b of the slinger 15b is externally fitted and fixed to the hub 3 which rotates under use. In this state, the tip edges of the seal lips 21a to 21c are brought into sliding contact with the surface of the slinger 15b over the entire circumference and the axially inboard end opening of the annular space 8 (see FIG. 9) is sealed off.

Particularly, in this example, it is possible to improve sealability of the fitting part of the rotating cylindrical portion 22b of the slinger 15b and the outer circumferential surface of the hub 3 in a state in which the combined seal ring with an encoder 10a is mounted as described above.

That is, in this example, the inner circumferential surface of the rotating cylindrical portion 22b of the slinger 15b is formed to be the stepped cylindrical surface in which the large-diameter portion 25 and the small-diameter portion 26 are continuously connected by the stepped portion 27. Accordingly, when the portion matching the small-diameter portion 26 in the axial direction is elastically enlarged in diameter by externally fitting and fixing the small-diameter portion 26 to the outer circumferential surface of the hub 3 by tight fit, the influence of the enlargement in diameter of the small-diameter portion 26 can be effectively prevented from being transmitted to the rotating circular ring portion 23b by elastically deforming the portion which matches the large-diameter portion 25, which is formed between the small-diameter portion 26 and the rotating circular ring portion 23b, and which is smaller in the axial thickness than the portion matching the small-diameter portion 26. The rotating circular ring portion 23b has high rigidity in the radial direction due to its shape. Accordingly, since the enlargement in diameter of the encoder 16b can be effectively prevented, the inner diameter of the encoder 16b can be kept smaller than the outer diameter of the portion of the outer circumferential surface of the hub 3 to which the slinger 15b is externally fitted and fixed. In this example, since the axially inboard half portion of the cylindrical surface portion 28 is located inside the axially inboard surface of the rotating circular ring portion 23b in the axial direction and the axial distance from the small-diameter portion 26 to the axially inboard half portion of the cylindrical surface portion 28 is set to be large, it is possible to make it difficult to transmit the influence of the enlargement in diameter of the small-diameter portion 26 to the axially inboard half portion of the cylindrical surface portion 28. Accordingly, according to the structure of this example, it is possible to bring the cylindrical surface portion 28 of the inner circumferential surface of the encoder 16b into contact with the outer circumferential surface of the hub 3 with an interference over the entire circumference (particularly, in this example, the interference of the axially inboard half portion of the cylindrical surface portion 28 is larger than the interference of the axially outboard half portion).

In this example, since the encoder 16b is formed by solidifying the permanent magnet material, this configuration is advantageous for increasing the interference.

That is, the inner diameter of the non-magnetized encoder pulled out of the molding die 32 (32a) becomes smaller than the outer diameter of the portion forming the inner circumferential surface of the encoder 16b among the inner surface of the molding die 32 (32a) by the solidification. Accordingly, it is possible to increase the interference even when the inner circumferential edge portion of the non-magnetized encoder is not deformed or the quantity of deformation is suppressed to be small at the time of pulling the slinger 15b and the non-magnetized encoder out of the molding die 32 (32a). In general, since rubber or synthetic resin as the permanent magnet material decreases in volume by 2% to 3% due to the solidification, the inner diameter decreases by about 0.5% to 1% in a state in which the encoder does not contain magnetic powder and is not secured to the slinger 15b, but the reduction rate of the inner diameter decreases in a state in which the encoder contains 80 wt % to 90 wt % of the magnetic material and is secured to the slinger 15b. Accordingly, the inner diameter of the encoder 16b is not smaller than the inner diameter of the small-diameter portion 26 (the relationship of $\phi d1 < \phi d2$ is kept). In this example, since the above-mentioned annealing process is performed on the solidified permanent magnet material, it is possible to further increase the interference.

In this example, since a lip is not formed on the inner circumferential surface of the encoder 16b, a portion (peripheral portion) in the vicinity of the cylindrical surface portion 28 of the inner circumferential surface of the encoder 16b is compressed in the radial direction due to the contact with the outer circumferential surface of the hub 3 when the slinger 15b is externally fitted and fixed to the hub 3. The compression force generated in the inner circumferential edge portion of the encoder 16b in this way generates a tightening force much larger than the tightening force generated based on the bending deformation of the lip. Accordingly, in this example, even when the amount of the interference is smaller than that in the case in which the lip is formed, it is possible to generate a sufficiently large tightening force using the inner circumferential surface of the encoder 16b.

As a result, according to the present invention, it is possible to improve sealability of the fitting part of the rotary cylindrical portion 22b of the slinger 15b and the outer circumferential surface of the hub 3.

The other configurations and operational advantages are the same as in the first example having the above-mentioned structure in the related art.

Second Example of Embodiment

Figure 5:
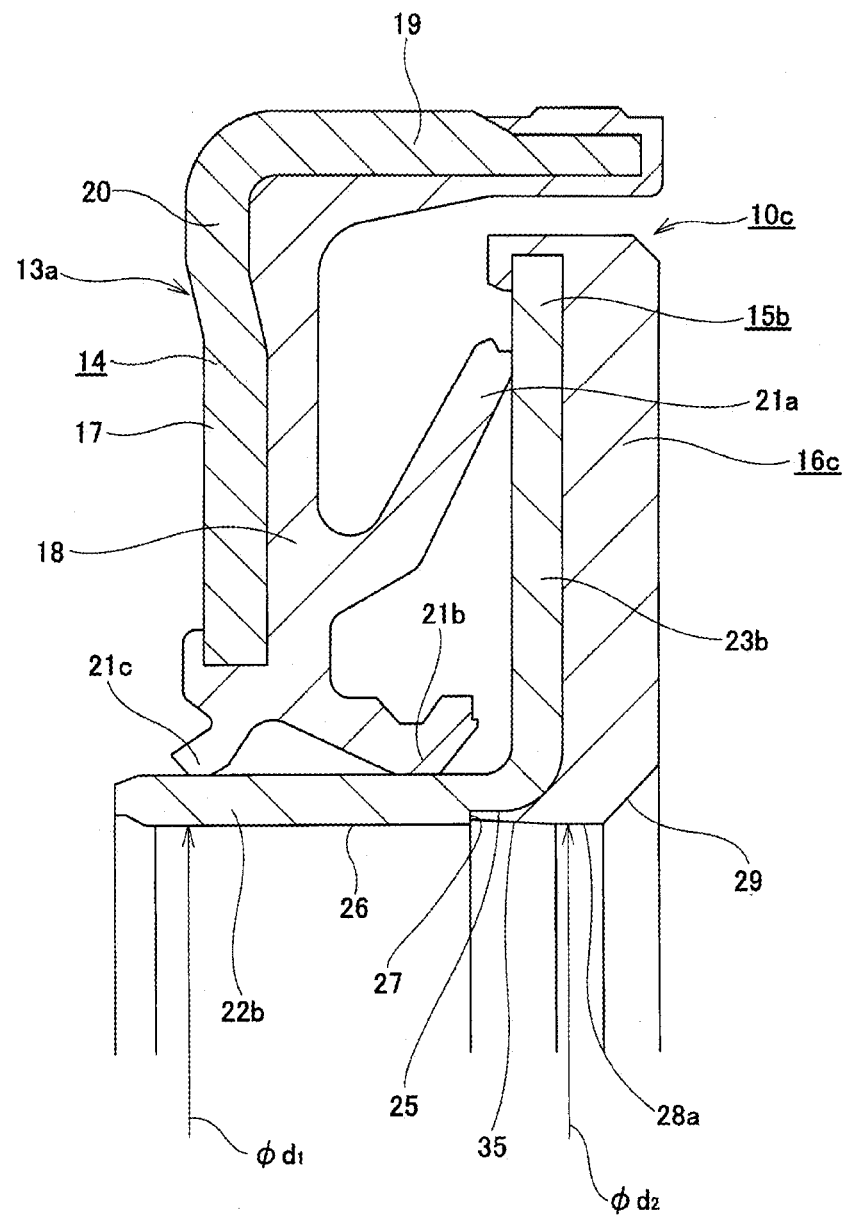
FIG. 5 is a partial cross-sectional view illustrating a second example of the embodiment of the present invention and corresponding to FIG. 1.
Figure 6:
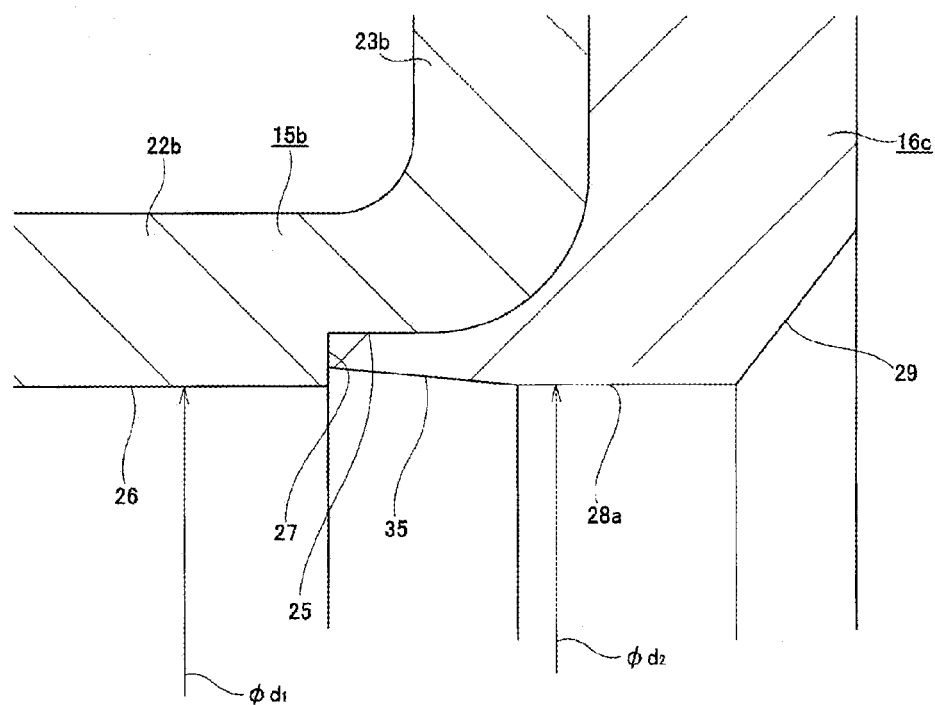
FIG. 6 is a view corresponding to FIG. 2.

A second example of the embodiment of the present invention will be described below with reference to FIGS. 5 and 6. This example provides a structure which is more suitable for a case in which the content of the magnetic material is less (for example, ranges from 50 wt % to 70 wt %) than that in the above-mentioned first example of the embodiment. Specifically, the inner circumferential surface of the encoder 16c includes a partial conical surface portion 35 which is inclined in a direction in which the inner diameter decreases toward the axially inboard and which is formed in an axially outboard end portion, a cylindrical surface portion 28a which is formed in an axially intermediate portion, and a chamfered portion 29 which is formed in an axially inboard end portion. The axially inboard half portion of the cylindrical surface portion 28a having the smallest inner diameter ($\phi d2$) is located inside the axially inboard surface of the rotary circular ring portion 23b of the slinger 15b in the axial direction. The inner diameter ($\phi d2$) of the cylindrical surface portion 28a is controlled to be equal to or greater than the inner diameter ($\phi d1$) of the small-diameter portion 26 of the rotary cylindrical portion 22b of the slinger 15b ($\phi d2 \geq \phi d1$, which is defined as $\phi d2 \approx \phi d1$ in the illustrated example). In the state in which the combined seal ring 10c with an encoder is assembled, the cylindrical surface portion 28a of the inner circumferential surface of the encoder 16c is brought into contact with the outer circumferential surface of the hub 3 (see FIGS. 1 and 9) with an interference.

In this example having the above-mentioned configuration, since the inner diameter of the encoder 16c (the cylindrical surface portion 28a) is set to be smaller than that in the first example of the embodiment, it is possible to secure a large interference with respect to the outer circumferential surface of the hub 3 and to further achieve improvement in sealability of the fitting part. In this example, when the slinger 15b and the non-magnetized encoder is pulled out of the molding die, it is necessary to slightly deform (elastically deform) the inner circumferential edge portion (portion corresponding to the cylindrical surface portion 28a) of the non-magnetized encoder. However, since the content of the magnetic material in the permanent magnet material is suppressed to be low (the encoder is easily elastically deformed) and the molding die (upper die) can be guided in the insertion direction (to the right side in FIGS. 5 and 6) by the partial conical surface portion 35, such an operation can be practically carried out without any problem.

The other configurations and operational advantages are the same as in the first example of the embodiment.

Third Example of Embodiment

Figure 7:
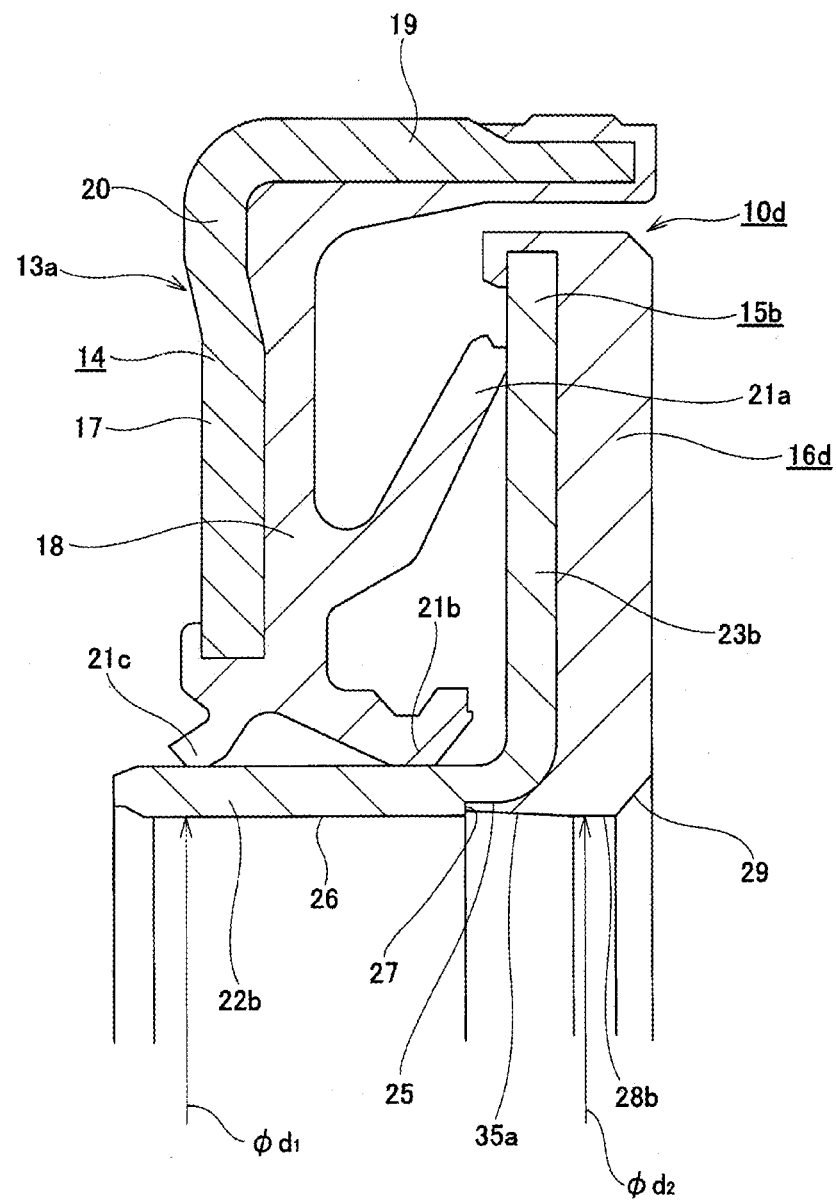
FIG. 7 is a partial cross-sectional view illustrating a third example of the embodiment of the present invention and corresponding to FIG. 1.
Figure 8:
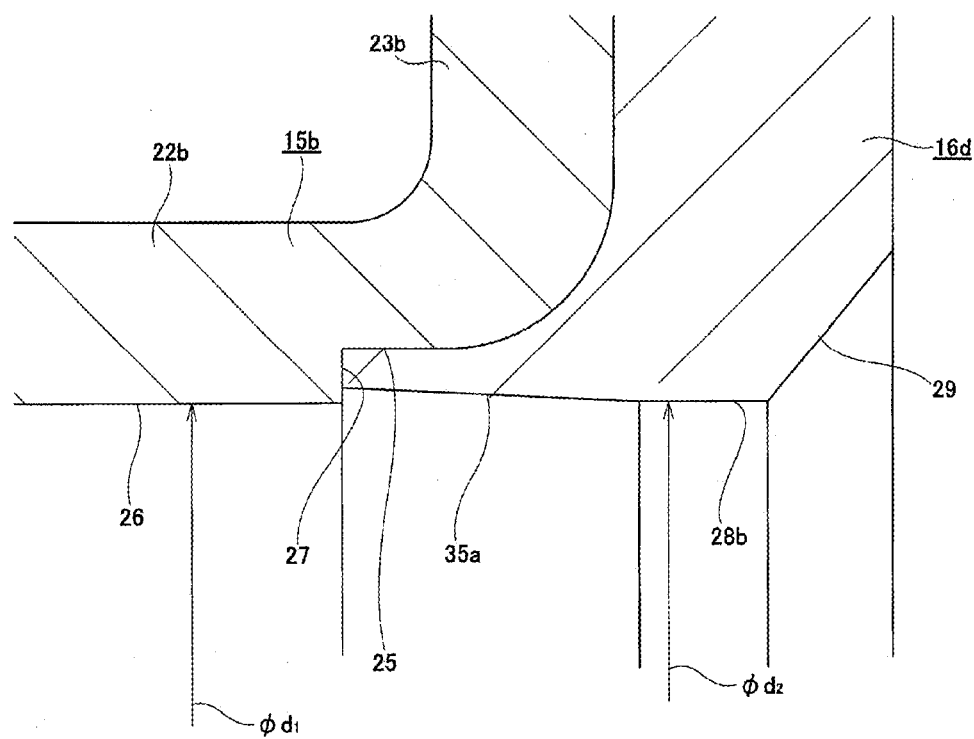
FIG. 8 is a view corresponding to FIG. 2.

A third example of the embodiment of the present invention will be described below with reference to FIGS. 7 and 8. This example provides a structure which is suitable for a case in which the content of the magnetic material in the permanent magnet material forming an encoder 16d is less (for example, ranges from 50 wt % to 70 wt %), similarly to the second example of the embodiment. The inner circumferential surface of the encoder 16d includes a partial conical surface portion 35a which is inclined in a direction in which the inner diameter decreases toward the axially inboard and which is formed in an axially outboard end portion, a cylindrical surface portion 28b which is formed in an axial intermediate portion, and a chamfered portion 29 which is formed in an axially inboard end portion. Particularly, in this example, by setting the axial size of the partial conical surface portion 35a to be larger (less in inclination angle) than that in the second example of the embodiment, the entire cylindrical surface portion 28b is located inside the axially inboard surface of the rotary circular ring portion 23b of the slinger 15b in the axial direction. In this example, in the state in which the combined seal ring 10d with an encoder is assembled, the cylindrical surface portion 28b of the inner circumferential surface of the encoder 16d is brought into contact with the outer circumferential surface of the hub 3 (see FIGS. 1 and 9) with an interference.

In this example having the above-mentioned configuration, even when a portion matching the small-diameter portion 26 in the axial direction is elastically enlarged in diameter by externally fitting and fixing the small-diameter portion 26 of the rotary cylindrical portion 22b of the slinger 15b to the hub 3 by tight fit, it is possible to effectively prevent the influence of the enlargement in diameter of the small-diameter portion 26 from being transmitted to the cylindrical surface portion 28b based on the long axial distance from the small-diameter portion 26 to the cylindrical surface portion 28b and the presence of the rotary circular ring portion 23b having high rigidity. Accordingly, it is possible to secure a larger interference of the cylindrical surface portion 28b with respect to the hub 3 and to further achieve improvement in sealability of the fitting part.

The other configurations and operational advantages are the same as in the first and second examples of the embodiment.

This application is based on Japanese Patent Application No. 2013-215358, filed Oct. 16, 2013, the content of which is incorporated herein by reference.

INDUSTRIAL APPLICABILITY

When the present invention is put into practice, the number of seal lips formed in the elastic member may be one (preferably only a side lip which is likely to change an interference), or may be two, or may be three as in the above-mentioned examples, or more. The rolling bearing unit with an encoder according to the present invention is not limited to a vehicle wheel-supporting rolling bearing unit for supporting vehicle wheels with an automobile to a suspension, but may be used as a rolling bearing unit (rolling bearing) in which a rotation speed of a rotary member needs to be detected and which constitutes a rotation support of various mechanical devices, such as machining tools or industrial machines. In the above-mentioned examples of the embodiment, the portion having the smallest inner diameter on the inner circumferential surface of the encoder is formed of the cylindrical surface portion having a single cylindrical surface shape, but the shape of the portion is not limited to the cylindrical surface shape.

DESCRIPTION OF REFERENCE NUMERALS AND SIGNS 1 rolling bearing unit with an encoder
2 outer ring (outer race member)
3, 3a hub (inner race member)
4 outer raceway
5 inner raceway
6 ball (rolling element)
7 retainer
8 annular space
9 seal ring
10, 10a to 10d encoder
11 metal insert
12 seal lip
13, 13a combined seal ring
14 seal ring
15, 15a, 15b slinger
16, 16a to 16d combined seal ring with an encoder
17 metal insert
18 elastic member
19 fixed cylindrical portion
20 fixed circular ring portion
21a to 21c seal lip
22, 22a, 22b rotating cylindrical portion
23, 23a, 23b rotating circular ring portion
24 lip portion
25 large-diameter portion
26 small-diameter portion
27 stepped portion
28, 28a, 28b cylindrical surface portion
29 chamfered portion
30, 30a upper die
31 lower die
32, 32a molding die
33, 33a cavity
34, 34a angular portion
35 partial conical surface portion
36 extra-thickness portion

The invention claimed is:

1. A combined seal ring with an encoder being used to seal off an end opening of an annular space which is present between an outer circumferential surface of an inner race member rotating under use and an inner circumferential surface of an outer race member not rotating under use and to detect a rotation speed of the inner race member and comprising:

a seal ring that is internally fitted and fixed to the outer race member;
a slinger that is externally fitted and fixed to the inner race member; and
an encoder that is supported and fixed to the slinger, wherein:

the seal ring includes a metal insert and an elastic member having at least one seal lip bonded to the entire circumference of the metal insert;
the slinger has a substantially L-shaped cross-section formed of a metal plate and an annular shape as a whole and includes a rotating cylindrical portion that is externally fitted and fixed to the inner race member by tight fit and a rotating circular ring portion that is bent outward in a radial direction from an axially one-end edge of the rotating cylindrical portion;
the encoder is formed of a permanent magnet in which an S pole and an N pole are alternately arranged in a circumferential direction, is formed in a circular ring shape as a whole, and is supported and fixed to a side surface opposite to a side surface of the rotating circular ring portion facing the seal lip;
an inner circumferential surface of the rotating cylindrical portion is a stepped cylindrical surface in which a large-diameter portion formed at an axially one-end side of the rotating cylindrical portion and a small-diameter portion formed in at an axially opposite end side from the one-end side are continuously connected by a stepped portion having a circular ring shape;

the encoder does not have a lip on an inner circumferential surface thereof and is formed by solidifying and securing a molten permanent magnet material to the slinger in a state in which the slinger is disposed in a molding die such that a part of the molding die collides with the stepped portion;

when an outer diameter of a portion to which the slinger is externally fitted and fixed on the outer circumferential surface of the inner race member is defined as $\phi D$, an inner diameter of the small-diameter portion in a free state is defined as $\phi d1$, and an inner diameter of the encoder in a free state is defined as $\phi d2$, a relationship of $\phi d1 \leq \phi d2 < \phi D$ is satisfied; and the inner circumferential surface of the encoder contacts with the inner race member with an interference in a state that the slinger is externally fitted and fixed to the inner race member.

2. The combined seal ring with an encoder according to claim 1, wherein a radial thickness of the rotating cylindrical portion is smaller in a portion matching the large-diameter portion than in a portion matching the small-diameter portion in the axial direction.

3. The combined seal ring with an encoder according to claim 1, wherein at least a part in the axial direction of a portion having a smallest inner diameter in the inner circumferential surface of the encoder is located farther from the rotating cylindrical portion in the axial direction than a side surface to which the encoder is supported and fixed in the rotating circular ring portion.

4. The combined seal ring with an encoder according to claim 1, wherein a portion having a smallest inner diameter in the inner circumferential surface of the encoder is constituted by a cylindrical surface portion of which the inner diameter does not vary in the axial direction.

5. A rolling bearing unit with an encoder comprising:
an inner race member that has an inner raceway on an outer circumferential surface thereof;
an outer race member that has an outer on an inner circumferential surface;
a plurality of rolling elements that are disposed to be rollable between the inner raceway and the outer raceway; and
a combined seal ring that seals off an end opening of an annular space present between the outer circumferential surface of the inner race member and the inner circumferential surface of the outer race member, wherein
the combined seal ring is the combined seal ring with an encoder according to claim 1.

* * * * *